May 23, 1950 V. J. BANKS 2,509,080
LAWN MOWER ATTACHMENT
Filed Feb. 19, 1946 2 Sheets-Sheet 1
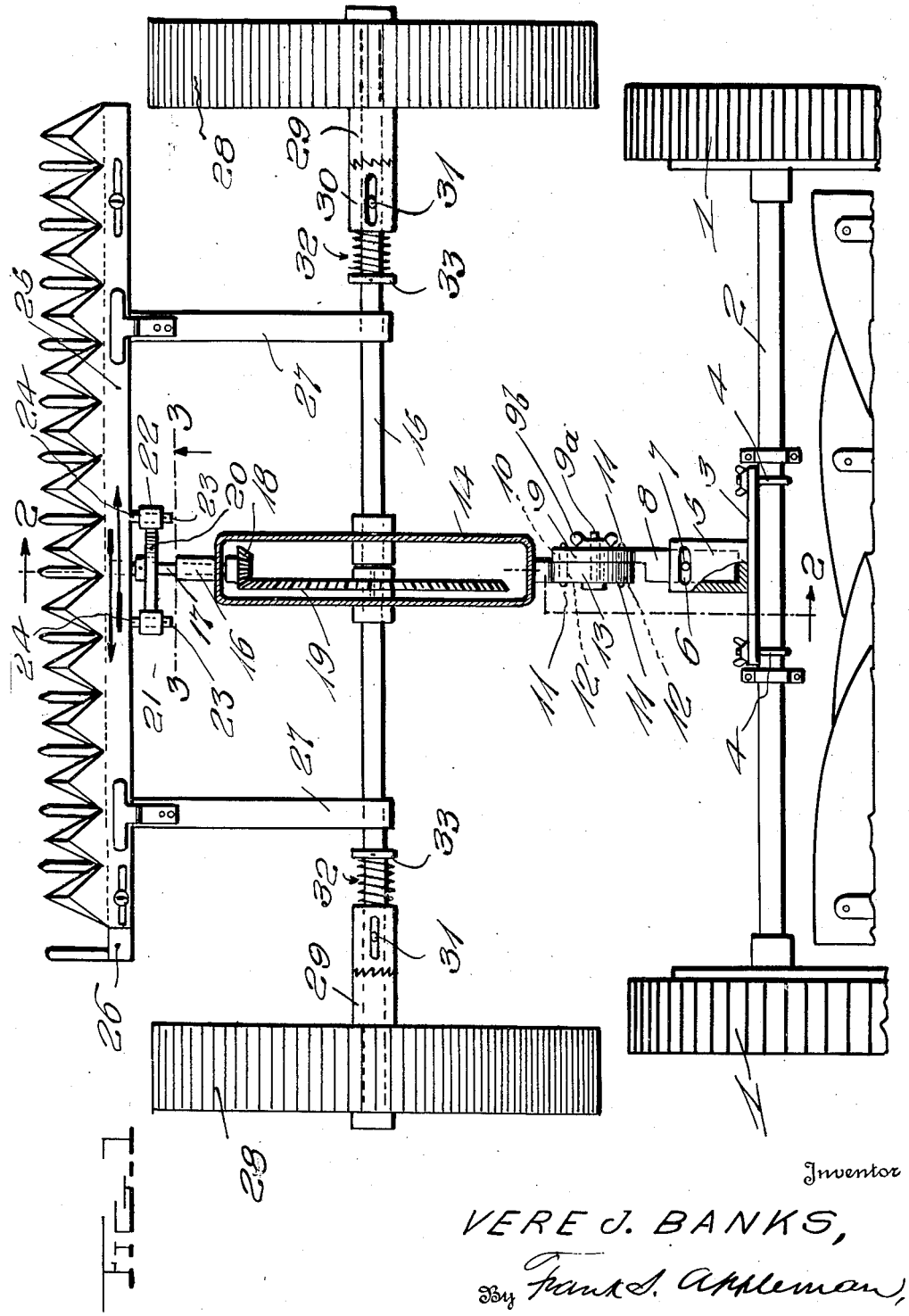
Inventor
VERE J. BANKS,
By Frank S. Appleman,
Attorney.

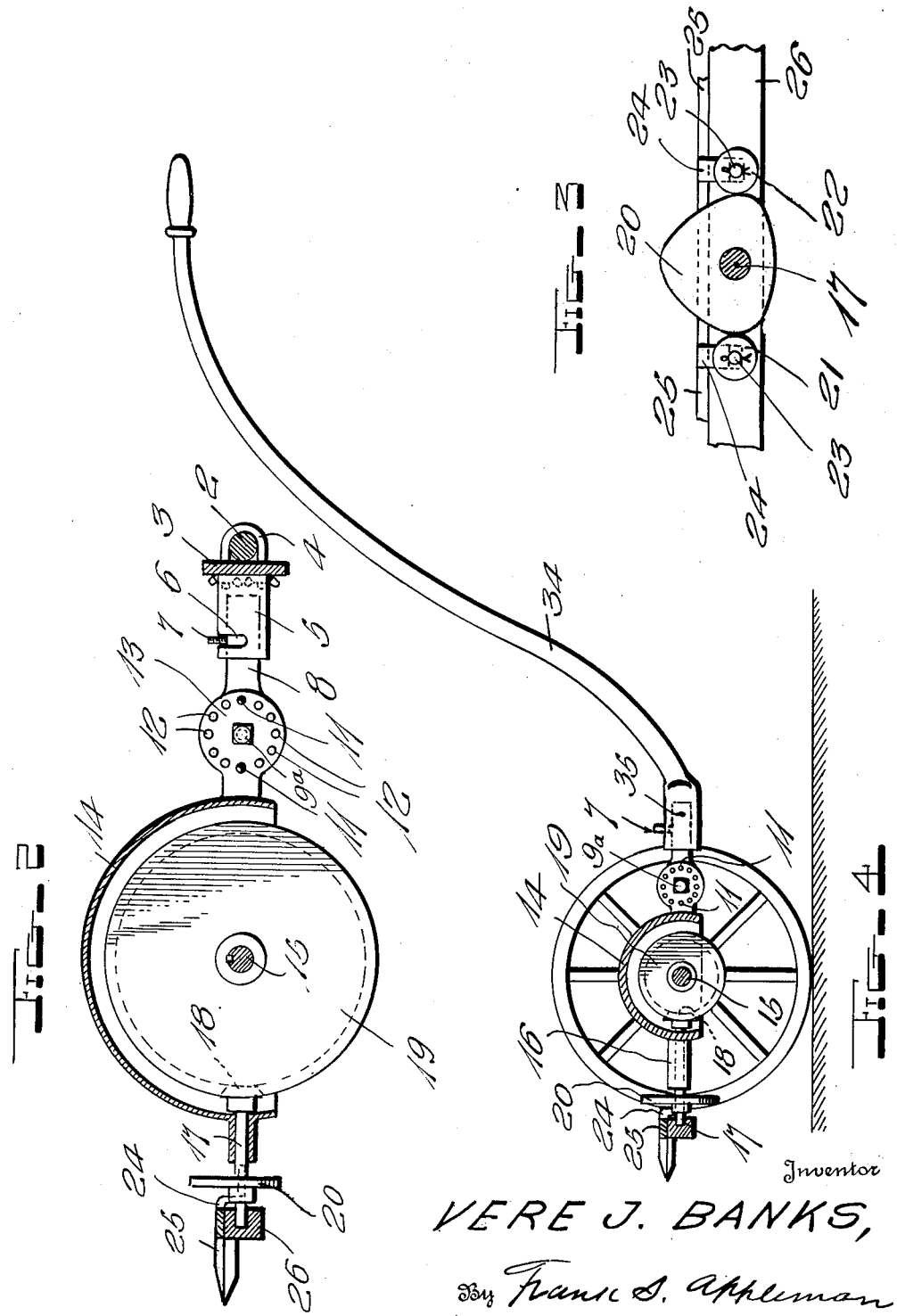

Patented May 23, 1950

2,509,080

UNITED STATES PATENT OFFICE 2,509,080

LAWN MOWER ATTACHMENT

Vere J. Banks, Stroudsburg, Pa.

Application February 19, 1946, Serial No. 648,577

2 Claims. (Cl. 56—296)

This invention relates to lawn mowers and may be regarded as an attachment for ordinary lawn mowers, effective to cut high vegetation, grass or weeds in advance of the conventional lawn mower; the said attachment being effective for use as a trimming device to be propelled by hand independently of the conventional lawn mower.

An object of this invention is to provide a cutter of the sickle bar type, having novel means for the reciprocation of the sickle bar and novel means for attaching this auxiliary cutter to a frame or part of the conventional lawn mower; means being furthermore provided for regulating the position of the sickle bar with relation to the terrain over which it is propelled.

A further object of the invention is to provide a novel hitch or connection by which the auxiliary cutter is attached to the conventional mower and the use thereof in association with a handle by which the auxiliary cutter may be propelled independently for trimming vegetation or the like.

A still further object of the invention is to produce a device of the character indicated comprising comparatively few, inexpensive parts, which are strong and durable, as well as efficient and satisfactory in use.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a plan view of a fragment of a conventional lawn mower, showing an auxiliary cutting device embodying the invention applied thereto, parts being in section;

Figure 2 illustrates a sectional view on the line 2—2 of Fig. 1;

Figure 3 illustrates an enlarged detail view on the line 3—3 of Fig. 1; and

Figure 4 illustrates a sectional view of the auxiliary cutter on a reduced scale, and having a handle for its manual operation.

In these drawings 1 denotes a fragment of a conventional lawn mower having a cross bar 2, to which the hitch or coupling for the auxiliary cutter is attached. The said coupling, in the present embodiment of the invention, comprises a plate 3 attached to the cross bar by clamps 4, and the said plate has a sleeve 5 attached thereto, which sleeve is provided with a transversely disposed slot 6, in which a pin 7 is lodged, the said pin extending through an arm 8 of the auxiliary cutter.

The arm 8 carries an apertured disk or plate 9, the apertures 10 of which are intended to receive studs or pins 11 inserted selectively in the said apertures when they aline with apertures 12 in a coacting disk or plate 13 that is attached to a housing 14 mounted on an axle 15 of the auxiliary cutting device. The disks 9 and 13 are connected by a bolt 9a secured by a wing nut 9b. The housing 14 has an integral bearing 16 in which a shaft 17 is rotatable, and the inner end of said shaft within the housing has a bevel gear 18 mounted on it, which bevel gear is engaged by a bevel gear 19 fastened on the axle 15, so that as the axle 15 is rotated, the shaft 17 is driven. A cam disk 20 is mounted on the shaft 17 and is adapted to engage wheels 21 and 22 which are rotatable on trunnions, such as 23, each projecting from an arm 24 on a sickle blade 25 which is mounted to slidably reciprocate on a coacting bar 26.

Arms 27 are attached to the axle 15 and project forwardly therefrom, and the sickle bar is supported by the said arms, and it is obvious that through the adjustment of the coupling between the arm 8 and the gear casing, the height of the sickle cutting instrumentalities may be varied so that vegetation may be cut at predetermined heights as the auxiliary cutter is operated.

The auxiliary cutter is supported by traction wheels 28 freely rotatable on the axle, and the hub 29 of each traction wheel has a toothed connection with a ratchet member 30 rotatable with the axle 15. The ratchet member 30 has a slot in which a pin 31 carried by the axle projects and the ratchet member is slidable on the axle. The ratchet teeth are forced into engagement by a spring 32 on the said axle, which spring abuts the end of the ratchet member and a shoulder 33 which is rigid with the axle 15. It is obvious that the parts just described with relation to the traction wheel are duplicated on the other side of the auxiliary cutter.

When the auxiliary cutter is to be employed as a trimming device independently of its connection to the lawn mower, the arm 8 is detached from the sleeve 5 and a handle 34 having a sleeve 35 is applied to the arm as it is shown in Fig. 4 and that part of the auxiliary cutter as heretofore described is employed in its entirety as a hand propelled trimming device having all of the characteristics and advantages enumerated.

I claim:

1. Means for coupling an auxiliary wheeled cutting mechanism forwardly of a standard lawn mower having a crossbar comprising a plate secured to the crossbar, a sleeve attached to and extending forwardly of said plate, an arm mounted within said sleeve, said sleeve having a transversely extending slot therein, a pin on said arm projecting into the slot whereby the arm may have limited rotational movement about the horizontal axis, a disk having a series of spaced openings adjacent the periphery thereof, a second disk having a series of spaced openings adjacent the periphery thereof in facial contact with the first mentioned disk, a stud extending through alined openings in the said disks to maintain the disks in the desired adjusted position, and means connecting the second mentioned disk to the wheeled auxiliary cutting mechanism.

2. Means for coupling an auxiliary wheeled cutting mechanism forwardly of a standard lawn mower having a crossbar comprising a plate secured to the crossbar, a sleeve attached to and extending forwardly of said plate, an arm mounted within said sleeve, said sleeve having a transversely extending slot therein, a pin on said arm projecting into the slot whereby the arm may have limited rotational movement about the horizontal axis, and an adjustable connection between said arm and the auxiliary cutting mechanism whereby the vertical position of said cutting mechanism relative to the lawn mover may be adjusted.

VERE J. BANKS.

REFERENCES CITED

The following references are of record in the file of this patent:

UNITED STATES PATENTS

| Number | Name | Date |
|---|---|---|
| 53,872 | Redmond | Apr. 10, 1866 |
| 293,477 | Lampton | Feb. 12, 1884 |
| 1,565,719 | Dunkley | Dec. 15, 1925 |
| 1,914,963 | Stephens | June 20, 1933 |
| 2,032,701 | Jones | Mar. 3, 1936 |

FOREIGN PATENTS

| Number | Country | Date |
|---|---|---|
| 292,425 | France | of 1899 |